United States Patent
Zheng et al.

(10) Patent No.: US 7,724,547 B1
(45) Date of Patent: May 25, 2010

(54) COMPENSATING ON-TIME DELAY OF SWITCHING TRANSISTOR IN SWITCHING POWER CONVERTERS

(75) Inventors: Junjie Zheng, Santa Clara, CA (US); John William Kesterson, San Jose, CA (US)

(73) Assignee: iWatt Inc., Los Gatos, CA (US)

( * ) Notice: Subject to any disclaimer, the term of this patent is extended or adjusted under 35 U.S.C. 154(b) by 295 days.

(21) Appl. No.: 11/847,147

(22) Filed: Aug. 29, 2007

Related U.S. Application Data

(60) Provisional application No. 60/844,985, filed on Sep. 15, 2006.

(51) Int. Cl.
  *H02M 3/335* (2006.01)

(52) U.S. Cl. .................................. 363/21.13; 323/283

(58) Field of Classification Search ......... 323/282–290, 323/299, 266, 235, 300, 303; 363/21.12–21.14, 363/53, 72, 80, 95, 98, 21.16
  See application file for complete search history.

(56) References Cited

U.S. PATENT DOCUMENTS 6,944,034 B1 * 9/2005 Shteynberg et al. ...... 363/21.13

* cited by examiner

*Primary Examiner*—Rajnikant B Patel
(74) *Attorney, Agent, or Firm*—Fenwick & West LLP

(57) ABSTRACT

A switch controller compensates the total on-time delay of the switch in a switching power converter. The intended on-time of the switching transistor for the present switching cycle is reduced by the time difference between the actual on-time and the intended on-time of the switching transistor in the previous switching cycle in the switching power converter. The total delay of the switch in the switching power converter, including propagation delay, switch turn-on delay, and switch turn-off delay, can be compensated in real time, cycle by cycle.

14 Claims, 4 Drawing Sheets

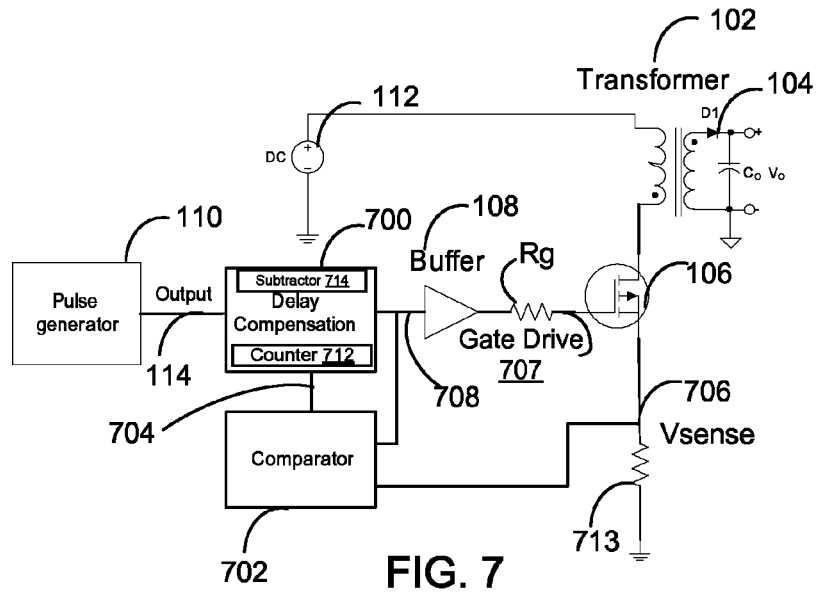
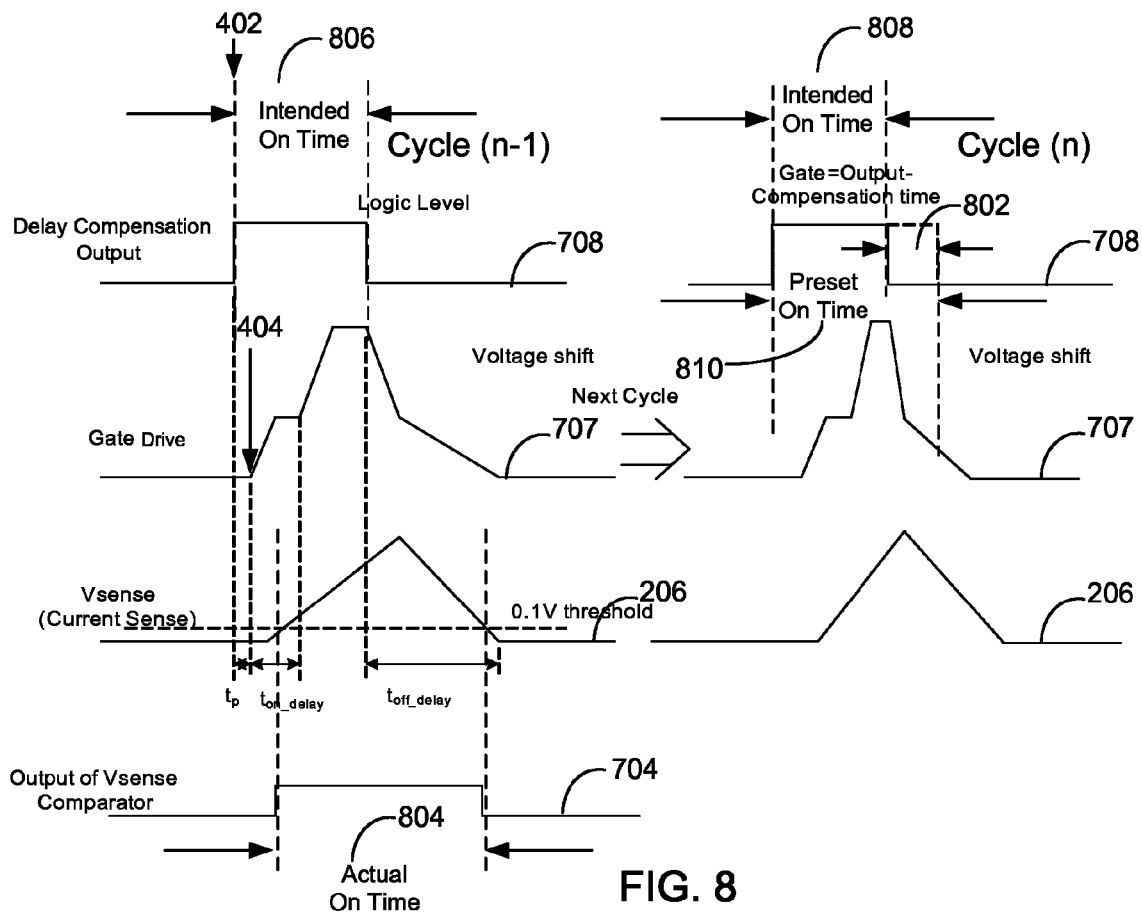
FIG. 7
FIG. 8

COMPENSATING ON-TIME DELAY OF SWITCHING TRANSISTOR IN SWITCHING POWER CONVERTERS

CROSS-REFERENCE TO RELATED APPLICATION

This applications claims priority under 35 U.S.C. §119(e) from co-pending U.S. Provisional Patent Application No. 60/844,985, entitled "Compensating On-time Delay of Switching Transistor in Switching Power Converters," filed on Sep. 15, 2006, which is incorporated by reference herein in its entirety.

BACKGROUND OF THE INVENTION

1. Field of the Invention

The present invention relates to power converters or power supplies, and more specifically to pulse width modulation (PWM) and pulse frequency modulation (PFM) controllers for driving a switching transistor in switching power converters.

2. Description of the Related Arts

Typical power converters include a power stage for delivering electrical power from a power source to a load, a switching device in the power stage that electrically couples or decouples the load to the power source, and a switch controller coupled to the switch for controlling the on-times and off-times of the switch. The switch is typically a MOSFET (Metal Oxide Semiconductor Field Effect Transistor) or a BJT (Bipolar Junction Transistor). A switch controller includes a pulse generator which generates a pulse for driving the switch. The positive and negative parts of the pulse correspond to the on-times and off-times of the switch. The on-times and off-times of the switch can be modified by the switch controller based upon a feedback signal representing the output power, output voltage or output current.

FIG. 1 illustrates an example of a conventional flyback type switching power converter. The power converter includes a transformer 102, a diode 104, a switch 106, a pulse generator 110, and a buffer 108. The pulse generator 110 generates the pulses (output) 114 (or 202 in FIG. 2) that drive the switch 106. The buffer 108 buffers the logic level pulses 114 before they drive the switching device 106, and shifts the voltage level of the gate drive signal 107 to a high voltage suitable for driving the switch 106. The rectified AC power (DC) 112 is stored in the transformer 102 while the switch 106 is on and is transferred to the load (not shown) while the switch 106 is off. Pulse Width Modulation (PWM) and Pulse Frequency Modulation (PFM) are conventional techniques used for controlling the power converters by controlling the widths or frequencies of the pulses 114 driving the switch 106 to achieve output power regulation.

FIG. 2 illustrates ideal turn-on waveforms for the switch 106. The logic level 202 represents the logic waveform of the output signal 114 of the pulse generator 110, the signal 204 illustrates the voltage waveform of the gate drive signal 107, and the current signal 206 illustrates the current through the switch 106. In ideal situations, the buffer 108 would have zero propagation delay, and the switching device 106 would have zero turn-on and turn-off delay, such that the gate drive signal 204 (107 in FIG. 1) is synchronous with the output signal 202 (114 in FIG. 1), and the current signal 206 is synchronous with the gate drive signal 204 (107 in FIG. 1).

In real power converter circuits, however, the buffer 108 certainly has propagation delay $t_p$, and the switching device 106 has significant turn-on delay $t_{on\_delay}$ and turn-off delay $t_{off\_delay}$ due to the parasitic capacitances and parasitic resistance in the switching device 106. For example, FIG. 3 illustrates a model of the MOSFET switch 106 that typically has parasitic resistance Rg and parasitic capacitances Cgd, Cgs, and Cds that cause the turn-on delay and the turn-off delay. The turn-off delay is generally longer than the turn-on delay, especially for BJT switches 106 due to the need for the minor electrons to be removed.

Thus, the real turn-on time $t_{on}$ of the switch 106 is given by: $t_{on} = t_{out} - t_{on\_delay} + t_{off\_delay}$, where $t_{out}$ is the intended on-time of the switch 106 as indicated by the output pulse 114 generated by the pulse generator 110. Obviously, the turn-on delay and turn-off delay of the switch 106 are out of control, which affect output voltage regulation. The total error $\Delta t_{on}$ of the on-time is given by:

$$\Delta t_{on} = \frac{-t_{on\_delay} + t_{off\_delay}}{t_{out}}.$$

FIG. 4 illustrates turn-on waveforms for the switch 106 in a real power converter circuit that has the propagation delays and the turn-on/turn-off delays. Due to the propagation delay $t_p$, the gate drive signal 204, 107 rises 404 later than the rising edge 402 of the output signal 202, rises to its on-level slowly during the turn-on delay $t_{on\_delay}$, and drops to its off-level slowly during the turn-off delay $t_{off\_delay}$. It can be seen that, when the ideal width $t_{out}$ of the output pulse 114 is narrow, the total on-time error becomes relatively longer, which creates significant ripple at the output of the power converter. For example, when the intended on-time $t_{out}$ is 400 ns, but the total delays of turn-on and turn-off time are over 200 ns, the total error is over 50%. This will result in high ripple voltage at the output of the power converter, which is undesirable for any type of power converter.

Conventional solutions sought to reduce the turn-off delay of the switch 106 so that the output voltage (Vo) of the power converter can be better regulated. FIGS. 5 and 6 illustrate conventional solutions that minimize the turn-off delay time by shorting the parasitic resistance Rg (502 in FIGS. 5 and 6) of the MOSFET switch 106 using a diode 500 (FIG. 5) or BJT 600 (FIG. 6) across the parasitic resistance 402. The electrons of the switch 106 can be discharged faster through the diode 500 or BJT 600 during turn-off of the switch 106. However, the conventional solutions could not eliminate the propagation delay of the buffer 108 or the turn-on delay of the switch 106. Furthermore, because the electrical properties of the switch 106 vary from switch to switch, a fixed solution such as the diode 500 (FIG. 5) or BJT 600 (FIG. 6) is not very effective in eliminating the turn-off delay of the switch 106.

Therefore, there is a need for a technique for reducing or entirely eliminating the on-time delay of the switch caused by the propagation delay through the buffer and the turn-on/turn-off delays in switching power converters.

SUMMARY OF THE INVENTION

The present invention provides a technique for compensating the total on-time delay of the switch in a switching power converter. The intended on-time of the switching transistor for the present switching cycle of the power converter is reduced by the time difference between the actual on-time and the intended on-time of the switching transistor in the previous switching cycle of the switching power converter.

In one embodiment, the power converter comprises a transformer coupled to a power source, a switch coupled to the transformer for coupling or decoupling the power source to or from a load of the switching power converter, and a switch controller coupled to the switch for controlling on-times and off-times of the switch. The switch controller determines a time difference between an actual on-time of the switch in a first switching cycle and an intended on-time of the switch for the first switching cycle, and adjusts the intended on-time of the switch for a second switching cycle subsequent to the first switching cycle based upon the time difference.

The switch controller determines the actual on-time of the switch in the first switching cycle by determining the duration of a current through the switch generating a voltage that exceeds a predetermined threshold voltage. The switch controller adjusts the intended on-time of the switch for the second switching cycle by reducing the intended on-time of the switch for the second switching cycle by the time difference between the actual on-time of the switch in the first switching cycle and the intended on-time of the switch for the first switching cycle.

The present invention has the advantage that the total delay of the switch in the switching power converter, including propagation delay, switch turn-on delay, and switch turn-off delay, is compensated in real time, cycle by cycle. Thus, the ripple in the output voltage of the switching power converter is significantly reduced.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 7 illustrates a flyback type switching power converter according to one embodiment of the present invention FIG. 8 illustrates the turn-on waveforms for the switch in a flyback type switching power converter according to one embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
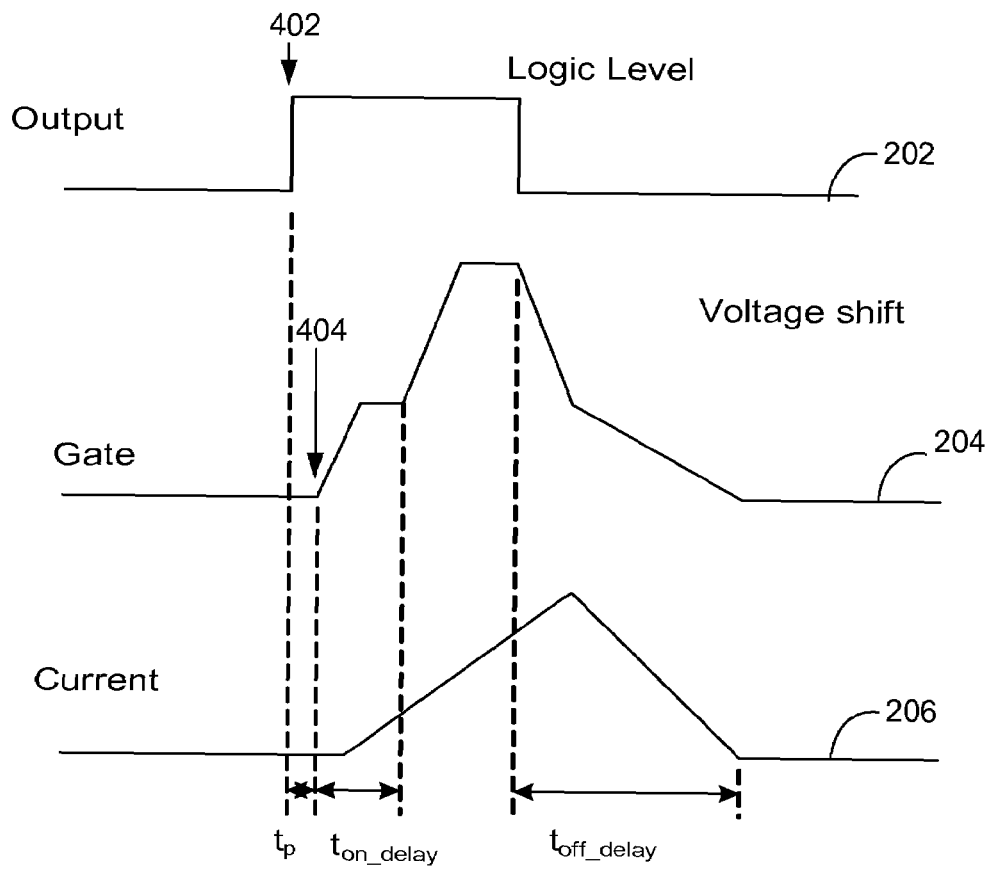
FIG. 4 illustrates turn-on waveforms for the switch in a real power converter circuit that has propagation delays and turn-on/turn-off delays.
Figure 5:
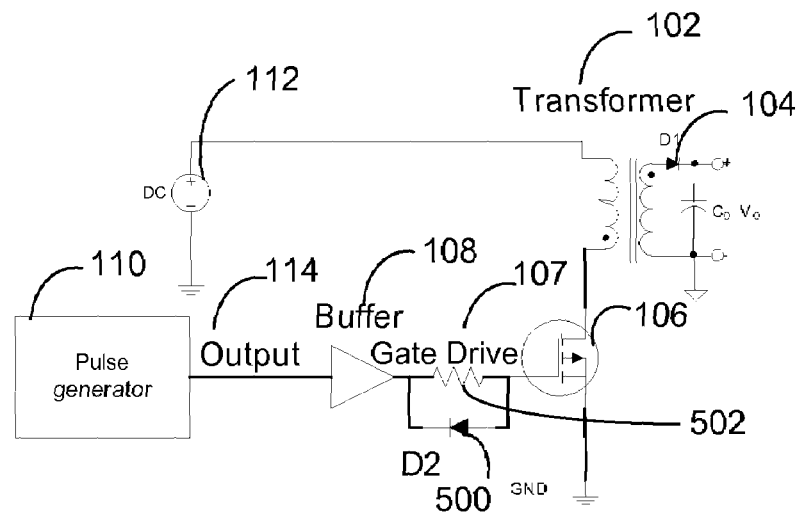
FIG. 5 illustrates a conventional solution that minimizes the turn-off delay time of the switch by shorting the parasitic resistance of the switch.
Figure 6:
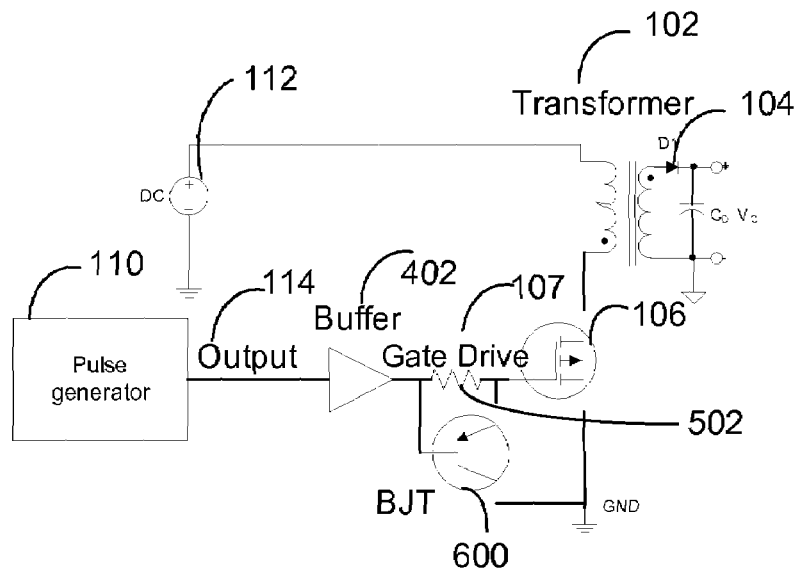
FIG. 6 illustrates another conventional solution that minimizes the turn-off delay time of the switch by shorting the parasitic resistance of the switch.

FIG. 7 illustrates a flyback type switching power converter according to one embodiment of the present invention, and FIG. 8 illustrates the changes in the turn-on waveforms for the switch in a flyback type switching power converter according to one embodiment of the present. FIG. 8 is similar to the waveforms in FIG. 4, but FIG. 8 additionally illustrates the turn-on waveforms in two consecutive cycles (n−1) and (n) of the switching power converter together with Vsense and the output of the Vsense comparator 704.

Figure 1:
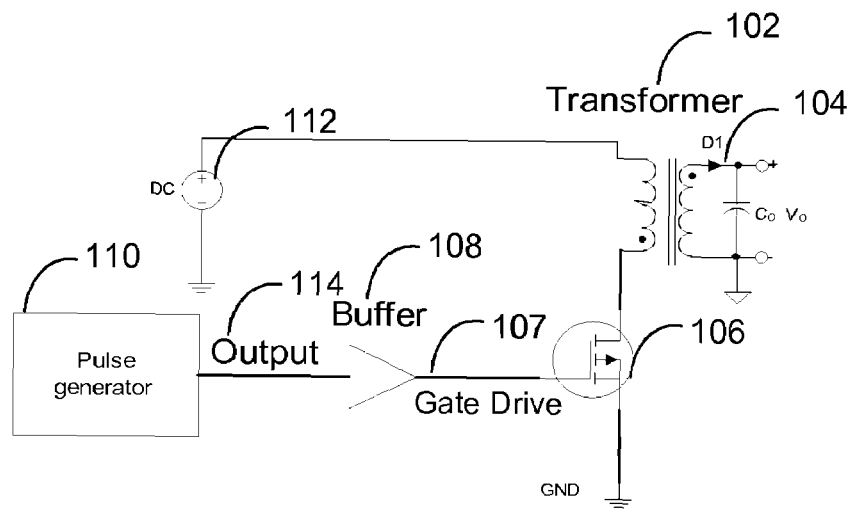
FIG. 1 illustrates an example of a conventional flyback type switching power converter.
Figure 2:
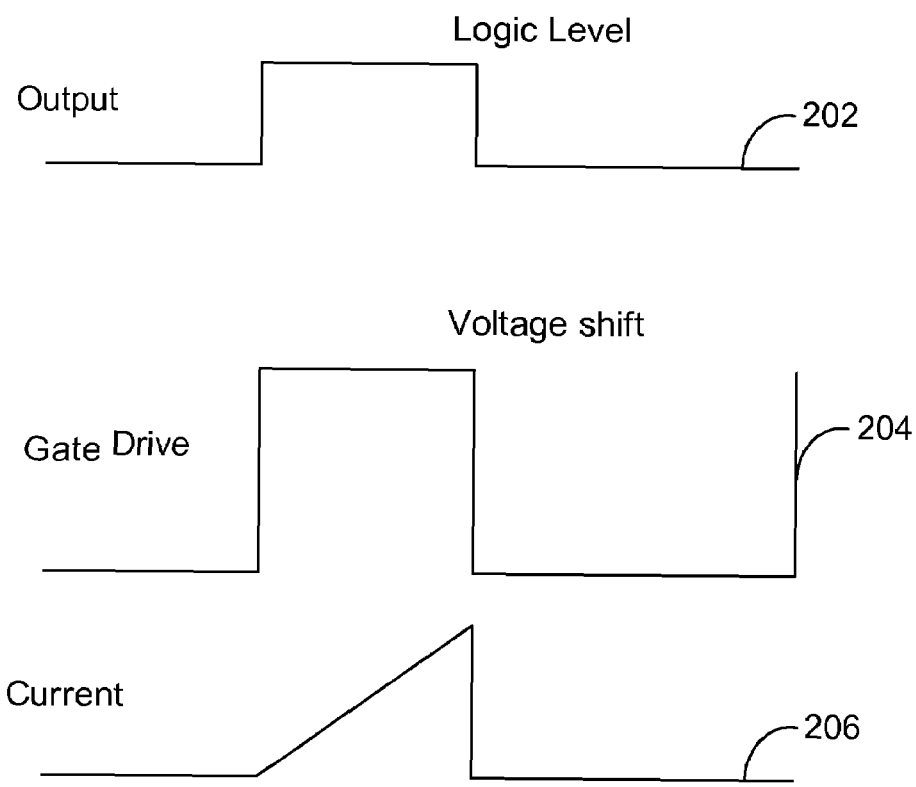
FIG. 2 illustrates ideal turn-on waveforms for the switch.
Figure 3:
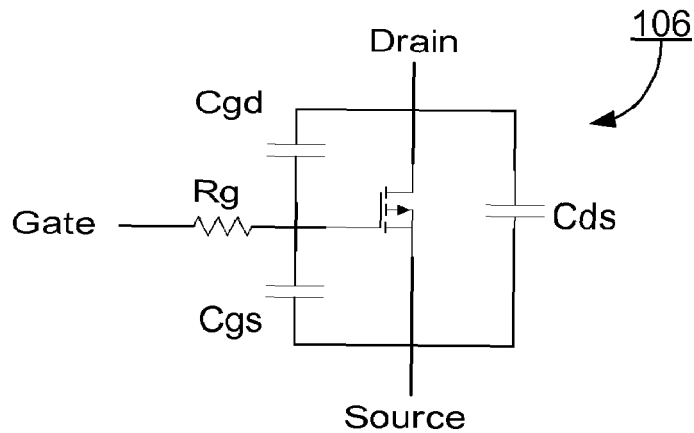
FIG. 3 illustrates a MOSFET switch that typically has parasitic resistance Rg and parasitic capacitances Cgd, Cgs, and Cds that cause the turn-on delay and the turn-off delay.

Referring to FIG. 7, the power converter of FIG. 7 is similar to that described in FIG. 1 except that a comparator 702 and a delay compensation circuitry 700 are added. That is, the power converter includes a transformer 102, a diode 104, a switch 106, a pulse generator 110, a buffer 108, a comparator 702, and delay compensation circuitry 700. FIG. 7 also shows the parasitic resistance Rg of the switch 106. The switch 106 is shown in FIG. 7 as a MOSFET, although other types of switching transistors such as BJTs may be used instead. The pulse generator 110, the delay compensation circuitry 700, and the comparator 702 together form a switch controller for the switch 106.

The pulse generator 110 generates the pulses (output) 114 that drive the switch 106. As will be explained below in more detail, the delay compensation circuitry 700 adjusts the positive duration of the output pulse 114 to generate an adjusted output pulse signal 708. The buffer 108 buffers the logic level pulses 708 output from the delay compensation circuitry 700 before they drive the switching device 106, and shifts the voltage level of the gate drive signal 707 to have a high voltage suitable for driving the switch 106. The rectified AC power (DC) 112 is stored in the transformer 102 while the switch 106 is on and is transferred to the load (not shown) of the power converter while the switch 106 is off. Pulse Width Modulation (PWM) and Pulse Frequency Modulation (PFM) are conventional techniques used for controlling the power converter by controlling the widths or frequencies of the pulses 114 driving the switch 106 to achieve output power regulation. Such control of the power converter is repeated periodically for a number of switching cycles.

The comparator 702 is coupled between the delay compensation circuitry and node 706, and senses the voltage Vsense at node 706, i.e., the source of the MOSFET switch 106. The voltage Vsense is a representation of the current through the switch 106, since the resistance 713 is a fixed value. The delay compensation circuitry 700 is coupled between the pulse generator 110, the buffer 108, and the comparator 702. The delay compensation circuitry 700 includes a counter 712, a subtractor 714, and other control logic (not shown).

Referring to FIG. 7, due to the propagation delay $t_p$ through the buffer 108, in cycle (n−1) the gate drive signal 707 rises 404 later than the rising edge 402 of the output signal 708, rises to its on-level slowly during the turn-on delay $t_{on\_delay}$, and drops to its off-level slowly during the turn-off delay $t_{off\_delay}$. Vsense is likewise turned on later due to the propagation delay $t_p$ and the turn-on delay $t_{on\_delay}$ and turned off slowly due to the turn-off delay $t_{off\_delay}$.

Referring to FIGS. 7 and 8 together, the comparator 702 compares Vsense with a very low threshold voltage (e.g., 0.1 volt) to output a pulse wave form 704 in cycle (n−1). Since Vsense is compared with a very low threshold voltage, the positive duration 804 of the pulse wave form 704 is substantially the same as the period during which the switch 106 is turned on and thus represents the actual on-time of the switch 106 during cycle (n−1). This positive duration is shown as the actual on-time 804 of cycle (n−1) in FIG. 8 (i.e., which is almost equal to the width of the period during which Vsense is positive since the threshold used by the comparator is very low, close to 0 volt).

The counter 712 measures such duration 804 of the positive pulse waveform 804 during the cycle (n−1) in terms of number of cycles of a predetermined clock frequency. As explained above, because of the propagation delay through the buffer 108 and the turn-on/turn-off delays of the switch 106, the actual on-time 804 is typically different from the intended on-time 806 of the switch as represented by the duration 806 during which the output signal 114 is high in cycle (n−1). The subtractor 714 calculates the difference (i.e., referred to as "compensation time") between the actual on-time 804 of the switch 106 and the intended on-time 806 of the switch 106 during the previous switching cycle (n−1) in terms of number of cycles of a predetermined clock frequency. That difference is referred to herein as the "compensation time" derived from the previous switching cycle (n−1).

In the next, current cycle (n), the control logic (not shown) in the delay compensation circuitry 700 compensates for the on-time delay of the switch 106 by subtracting the compensation time 802 from the pre-set on-time 810 of the output signal 114 for the present cycle (n) to generate an adjusted output pulse signal 708 for the present cycle (n) with a shorter, compensated on-time 808 that is intended. The gate drive signal 707 is also adjusted accordingly. Such delay compensation repeats in every switching cycle of the switching power converter to compensate for the on-time delay of the switch 106 in the current cycle based on the compensation time calculated in the previous switching cycle.

In summary, the switching power converter adjusts the intended on-time of the switch 106 by the following equation:

$$t_{on,\,intended}(n) = t_{on,\,preset}(n) - \text{compensation time; and}$$

$$\text{compensation time} = t_{on,\,actual}(n-1) - t_{on,\,intended}(n-1),$$

where $t_{on,\,intended}(n)$ is the intended on-time 808 of the switch 106 during cycle (n), $t_{on,\,preset}(n)$ is the known, preset on-time 810 of the output signal 114 from the pulse generator 110 for driving the switch 106 during cycle (n), $t_{on,\,actual}(n-1)$ is the actual on-time 804 of the switch 106 during cycle (n−1), and $t_{on,\,intended}(n-1)$ is the intended on-time 806 of the switch 106 during cycle (n−1).

In other embodiments, the compensation time can be predefined as a constant. In such other embodiments, the comparator 702 is not necessary, and the gate drive resistor Rg can be adjusted to meet the predefined constant.

As described above, the present invention provides a system and method that compensates the entire delay in the on-time for the switch of a switching power converter, including the propagation delay time from the drive signal buffer 108, and the turn-on delay and the turn-off delay of the switch 106. Because the total delay of the on-time of the switch 106 is compensated in the switching power converter, cycle by cycle in real time, the ripple in the output voltage is significantly reduced.

The present invention can be used to compensate the on-time delay in the switching transistor of any type of switching power converter, including AC-DC power converters, DC-DC power converters, and DC-AC power converters, regardless of the topology used in such switching power converters, including fly-back, fly-forward, buck, and the like.

Upon reading this disclosure, those of skill in the art will appreciate still additional alternative structural and functional designs for compensating the on-time delay of the switching transistor in switching power converters through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A power converter comprising:
a transformer coupled to a power source;
a switch coupled to the transformer for coupling or decoupling the power source to or from a load of the power converter; and
a switch controller coupled to the switch for controlling on-times and off-times of the switch, the switch controller determining a time difference between an actual on-time of the switch in a first switching cycle and an intended on-time of the switch for the first switching cycle and adjusting the intended on-time of the switch for a second switching cycle subsequent to the first switching cycle based upon the time difference.

2. The power converter of claim 1, wherein the switch controller determines the actual on-time of the switch in the first switching cycle by determining a duration of a current through the switch generating a voltage exceeding a predetermined threshold voltage.

3. The power converter of claim 1, wherein the switch controller controls the on-times and the off-times of the switch by generating a pulse signal controlling the switch, the pulse signal having first logic levels and second logic levels, and the intended on-time of the switch for the first switching cycle corresponds to a duration of the pulse signal in the first logic level during the first switching cycle.

4. The power converter of claim 1, wherein the switch controller adjusts the intended on-time of the switch for a second switching cycle by reducing the intended on-time of the switch for the second switching cycle by the time difference between the actual on-time of the switch in the first switching cycle and the intended on-time of the switch for the first switching cycle.

5. The power converter of claim 1, wherein the switch controller determines the time difference between the actual on-time of the switch in the first switching cycle and the intended on-time of the switch for the first switching cycle in numbers of cycles of a predetermined clock signal.

6. A power converter comprising:
a transformer coupled to a power source;
a switch coupled to the transformer for coupling or decoupling the power source to or from a load of the switching power converter;

a pulse generator generating a control pulse signal for controlling on-times and off-times of the switch, the control pulse signal having first logic levels during which the switch is turned on and second logic levels during which the switch is turned off; and delay compensation circuitry for adjusting an intended on-time of the switch for a second switching cycle subsequent to a first switching cycle based upon a time difference between an actual on-time of the switch in the first switching cycle and an intended on-time of the switch for the first switching cycle.

7. The power converter of claim 6, further comprising a comparator outputting a comparison pulse being in a first logic level while a voltage level corresponding to current through the switch exceeds a predetermined threshold voltage and being in a second logic level while the voltage level corresponding to the current through the switch does not exceed the predetermined threshold voltage.

8. The power converter of claim 7, wherein the delay compensation circuitry includes a counter counting numbers of cycles of a predetermined clock signal during which the comparison pulse is in the first logic level to determine the actual on-time of the switch in the first switching cycle.

9. The power converter of claim 6, wherein the delay compensation circuitry adjusts the intended on-time of the switch for the second switching cycle by reducing the intended on-time of the switch for the second switching cycle by the time difference between the actual on-time of the switch in the first switching cycle and the intended on-time of the switch for the first switching cycle.

10. A method of controlling a power converter, the power converter including a transformer coupled to a power source, a switch coupled to the transformer for coupling or decoupling the power source to or from a load, and a switch controller coupled to the switch for controlling on-times and off-times of the switch, the method comprising:

determining a time difference between an actual on-time of the switch in a first switching cycle and an intended on-time of the switch for the first switching cycle; and adjusting the intended on-time of the switch for a second switching cycle subsequent to the first switching cycle based upon the time difference.

11. The method of claim 10, further comprising determining the actual on-time of the switch in the first switching cycle by determining a duration of a current through the switch generating a voltage exceeding a predetermined threshold voltage.

12. The method of claim 10, further comprising generating a pulse signal controlling the on-times and the off-times of the switch, the pulse signal having first logic levels and second logic levels, and the intended on-time of the switch for the first switching cycle corresponding to a duration of the pulse signal in the first logic level during the first switching cycle.

13. The method of claim 10, wherein adjusting the intended on-time of the switch for the second switching cycle comprises reducing the intended on-time of the switch for the second switching cycle by the time difference between the actual on-time of the switch in the first switching cycle and the intended on-time of the switch for the first switching cycle.

14. The method of claim 10, wherein the time difference between the actual on-time of the switch in the first switching cycle and the intended on-time of the switch for the first switching cycle is determined in numbers of cycles of a predetermined clock signal.

\* \* \* \* \*